United States Patent
ChoFleming et al.

(10) Patent No.: US 12,332,802 B2
(45) Date of Patent: Jun. 17, 2025

(54) MULTI-STAGE CACHE TAG WITH FIRST STAGE TAG SIZE REDUCTION

(71) Applicant: Intel Corporation, Santa Clara, CA (US)

(72) Inventors: Kermin ChoFleming, Hudson, MA (US); Yu Bai, Shrewsbury, MA (US); Ping Zou, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 17/352,628

(22) Filed: Jun. 21, 2021

(65) Prior Publication Data

US 2022/0405209 A1 Dec. 22, 2022

(51) Int. Cl.
*G06F 12/0895* (2016.01)
*G06F 12/02* (2006.01)
*G06F 12/0811* (2016.01)
*G06F 12/0853* (2016.01)

(52) U.S. Cl.
CPC ...... *G06F 12/0895* (2013.01); *G06F 12/0238* (2013.01); *G06F 12/0811* (2013.01); *G06F 12/0853* (2013.01); *G06F 2212/1021* (2013.01)

(58) Field of Classification Search
CPC ............. G06F 12/0895; G06F 12/0811; G06F 12/0853; G06F 2212/1021
See application file for complete search history.

(56) References Cited

U.S. PATENT DOCUMENTS

2015/0278096 A1* 10/2015 Rolan ................. G06F 12/0895
   711/135
2021/0318958 A1* 10/2021 Pawlowski ......... G06F 12/0862

* cited by examiner

*Primary Examiner* — Baboucarr Faal
(74) *Attorney, Agent, or Firm* — Essential Patents Group, LLP

(57) ABSTRACT

An embodiment of an integrated circuit comprises circuitry to generate a cache tag for data to be stored in a cache memory, store a first portion of the cache tag in a primary tag memory, and store a second portion of the cache tag in a secondary tag memory, wherein a size of the first portion is smaller than a size of the second portion. Other embodiments are disclosed and claimed.

21 Claims, 15 Drawing Sheets

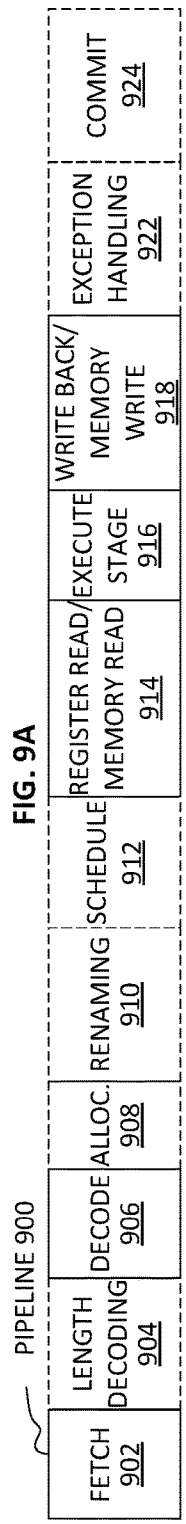
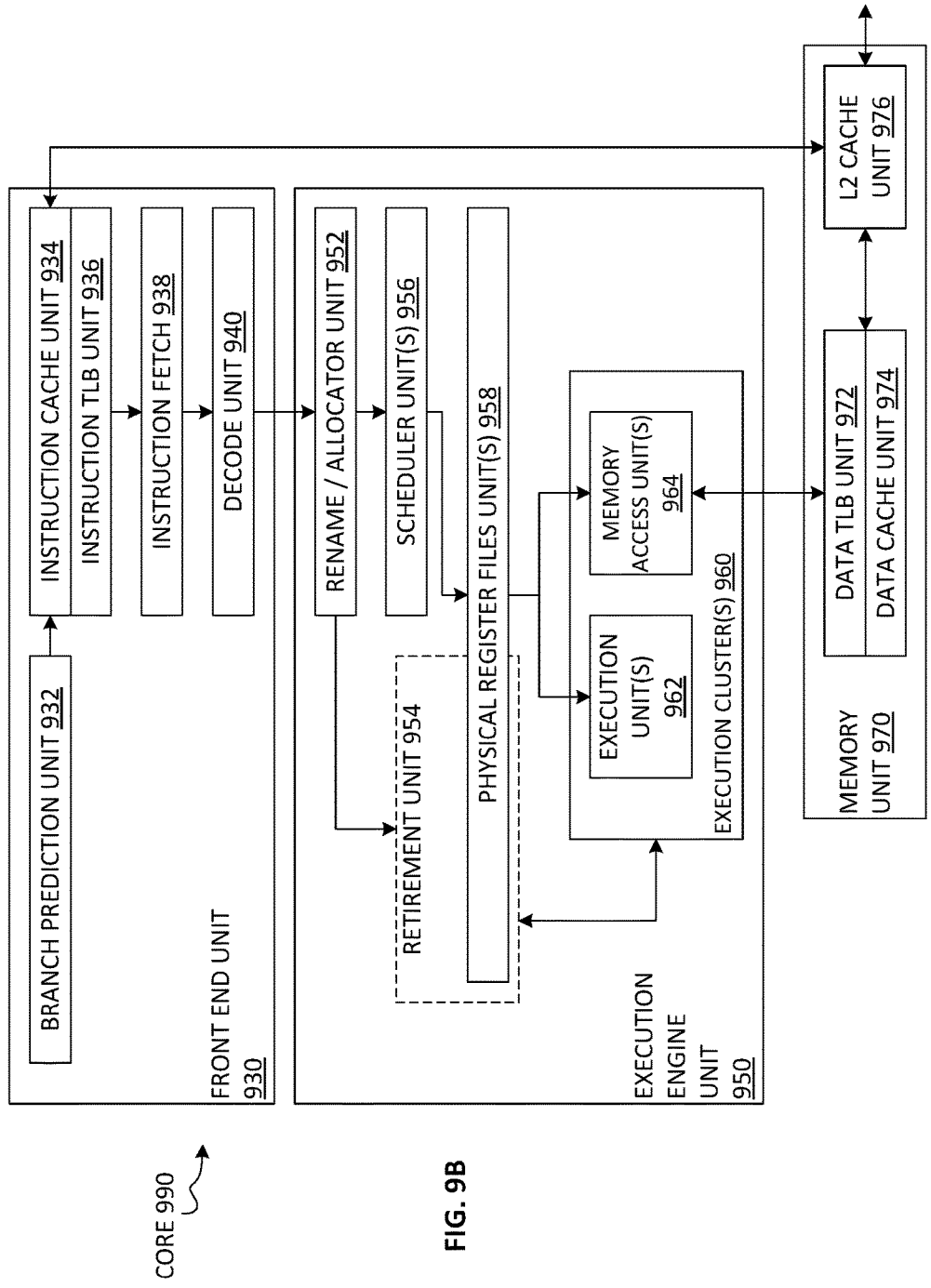
FIG. 9A
FIG. 9B

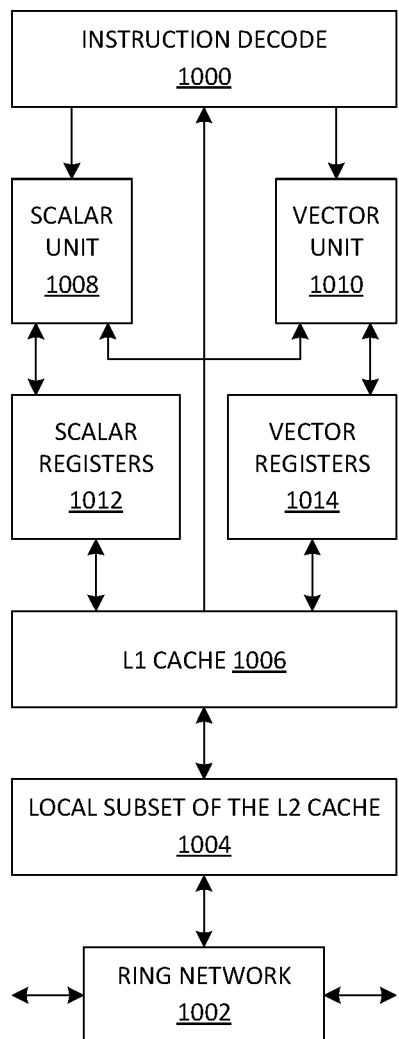 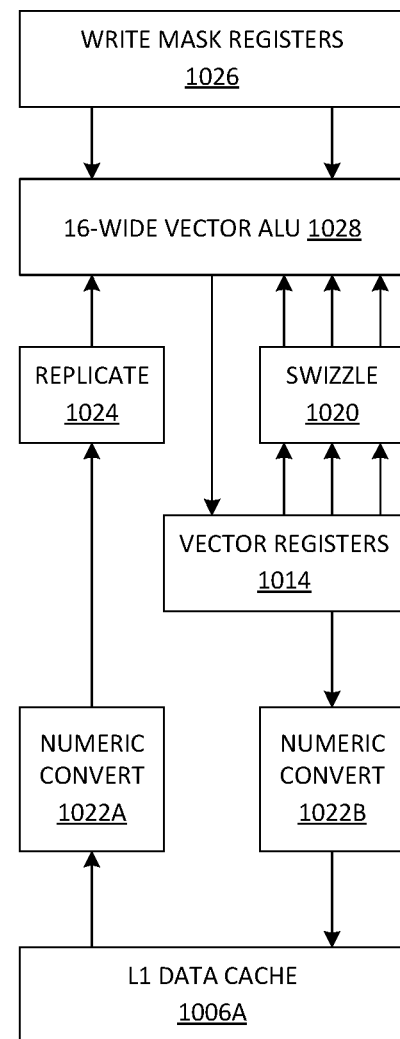
FIG. 10A
FIG. 10B

MULTI-STAGE CACHE TAG WITH FIRST STAGE TAG SIZE REDUCTION

BACKGROUND

1. Technical Field

This disclosure generally relates to cache technology, and more particularly to cache tag technology.

2. Background Art

Memory or storage caching refers to technology in which data is temporarily stored in some location that enables faster access to that data. For example, static random access memory (SRAM) may provide faster access than dynamic random access memory (DRAM), which may provide faster access than system storage (e.g., a solid state drive (SDD)), etc. A portion of memory available to a system may be designated as cache memory. A cache block (e.g., or cache line) may refer to a unit for cache storage, and a cache row (e.g., or cache set) may refer to a number of blocks or lines as determined by the layout of the cache (e.g., direct mapped, set-associative, fully associative, etc.). A cache tag may refer to an identifier for data stored in the cache, generally derived from a memory address. Because different regions of memory may be mapped into a cache line, the tag may be utilized to differentiate between them. A valid bit may be utilized to indicate whether the data in a cache line is valid or not. For an access to a particular memory address, a tag may be generated from the address and compared to tags associated with cache lines stored in the cache. If there is no match, the access is considered to 'miss' the cache. If there is a match and valid data is present in the cache that corresponds to the address, the access is considered to 'hit' the cache.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIGS. 10A-B illustrate a block diagram of a more specific exemplary in-order core architecture, which core would be one of several logic blocks (including other cores of the same type and/or different types) in a chip;

DETAILED DESCRIPTION

Figure 1:
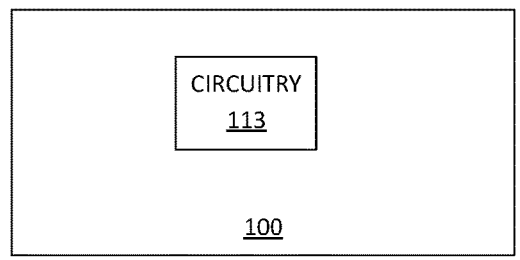
FIG. 1 is a block diagram of an example of an integrated circuit according to an embodiment.

Embodiments discussed herein variously provide techniques and mechanisms for multi-stage cache tags. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide multi-stage cache tags.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for tag size reduction. Recent advances in manufacturing technology have enabled the construction of large caches using tightly integrated DRAM. The size of these caches may be multiple gigabytes in some process technologies. In typical caches, tags are used to store metadata, such as address, to enable the retrieval of stored values, and this metadata can amount to 10-15% of the cache capacity in terms of bits stored (e.g., tens of megabytes or more). To reduces the size and power of these tag stores, some embodiments provide technology for a hybrid DRAM and SRAM tag storage. Some embodiments utilize a truncated SRAM tag to prune potential tag matches, requiring with high probability, exactly one DRAM tag lookup in the case of a cache hit and exactly zero DRAM tag lookups in the case of a cache miss. In some embodiments, more than half of the tag bits may be moved to DRAM in a typical large cache. In addition to substantially reducing tag area, some embodiments may also reduce tag power by up to half while composing and augmenting existing cache area reduction techniques.

Because the purpose of caches is to reduce latency and tag checks are on the critical path, it is valuable to store tags in faster memory (e.g., static random access memory (SRAM)). Unfortunately, the size of SRAM tags needed to cover a multiple gigabyte cache is prohibitively expensive in terms of both physical silicon cost of the tags and power consumption due to leakage on such a large array, which can amount to many watts. Many conventional techniques to address tag size problems for large caches relate to tag compression techniques. A common technique is sector cache, for example, in which contiguous large blocks of data are represented by a single tag, with single bits representing the validity of cache-line-sized subblocks. In entropy-reduction techniques, numerical patterns across cache tags are used to reduce the number of bits that need to be stored. Basic sector caches are deployed in practice. The main disadvantage in these caches is that data contiguity is required, which can reduce cache effectiveness in some workloads. More advanced sector caches, for example, those involving pointers to reduce the need for physical data contiguity, help this situation, but they are also more complex and require more area to implement. Entropy techniques have generally not been deployed because they are too complicated.

Some embodiments may provide technology to advantageously overcome one or more of the foregoing problems with tag power and/or silicon area by reducing the number of bits of SRAM required for tag storage. Some embodiments provide a hierarchical or two-step tag lookup scheme in which parts of the cache tags are stored in one memory device/structure (e.g., SRAM) and parts of the cache tags are stored in another memory device/structure (e.g., DRAM). During a first stage, a partial, probabilistic tag match is performed on SRAM. With high probability, this check identifies whether the tag is cached. If a match is found, data and additional tag information are accessed from DRAM. A final tag check is performed to confirm the data presence. Advantageously, some embodiments allow most of the cache tag storage to be provided in DRAM, which is energy and area efficient, while retaining performance characteristics largely similar to an SRAM-only tag implementation. For example, with a less than about 1% chance of additional work, some embodiments may reduce the size of tag storage in SRAM by at least 50%. As smaller tag stores and partial tag matches require less energy, some embodiments may also decrease the dynamic energy of the cache, relative to conventional single stage cache tag storage. Some embodiments may also be combined with tag compression techniques, potentially allowing for larger reduction in tag size.

With reference to FIG. 1, an embodiment of an integrated circuit 100 may include circuitry 113 configured to generate a cache tag for data to be stored in a cache memory, store a first portion of the cache tag in a primary tag memory, and store a second portion of the cache tag in a secondary tag memory, where a size of the first portion is smaller than a size of the second portion. In some embodiments, the circuitry 113 may be further configured to perform a multi-step tag lookup to determine if an access request hits the cache memory. For example, the circuitry 113 may be configured to perform a first tag match for the access request against the first portion of the cache tag stored in the primary tag memory and, if a match is found, perform a second tag match for the access request against the second portion of the cache tag stored in the secondary tag memory. The circuitry 113 may also be configured to perform a serial search to determine a final match if multiple tags matches are returned for the first tag match, or to perform a parallel search to determine a final match if multiple tags matches are returned for the first tag match.

Some embodiments of the integrated circuit 100 may include a first memory structure to provide the primary tag memory, and a second memory structure to provide the cache memory and the secondary tag memory, where the first memory structure provides one or more of different performance and power characteristics in operation as compared to the second memory structure. For example, the first memory structure may comprise static random access memory (SRAM), the second memory structure may comprise dynamic random access memory (DRAM), and a capacity of the primary tag memory may be less than half of a capacity of the secondary tag memory (e.g., or much less such as less than 10% of the capacity of the secondary tag memory).

Figure 2A:
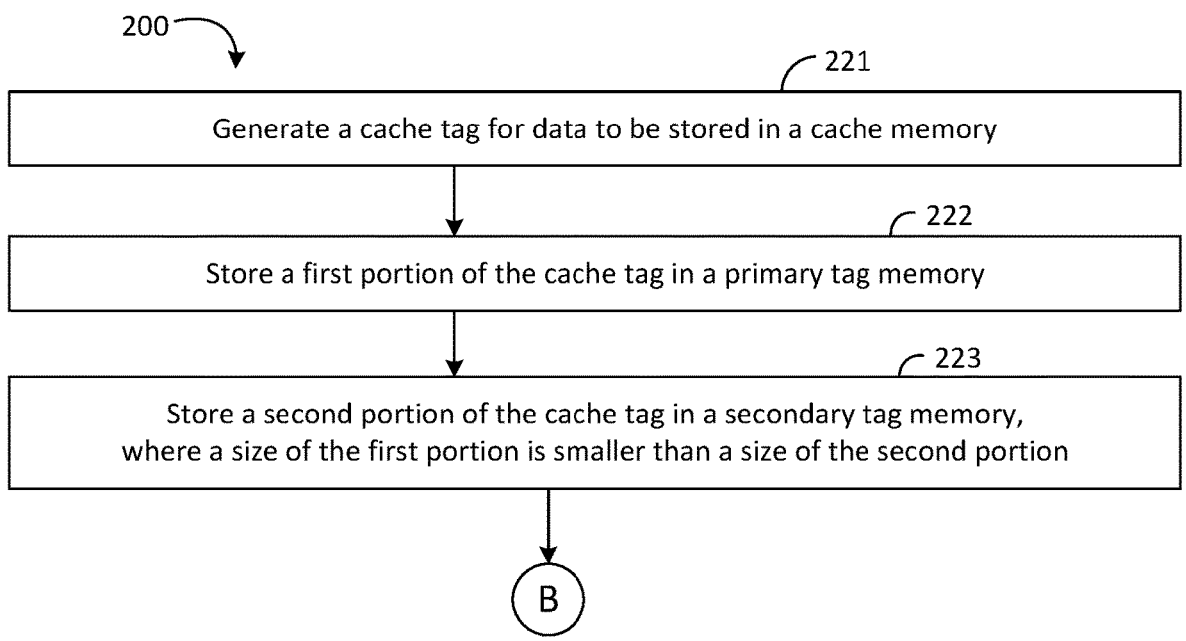
FIGS. 2A to 2B are flow diagrams of an example of a method according to an embodiment.
Figure 2B:
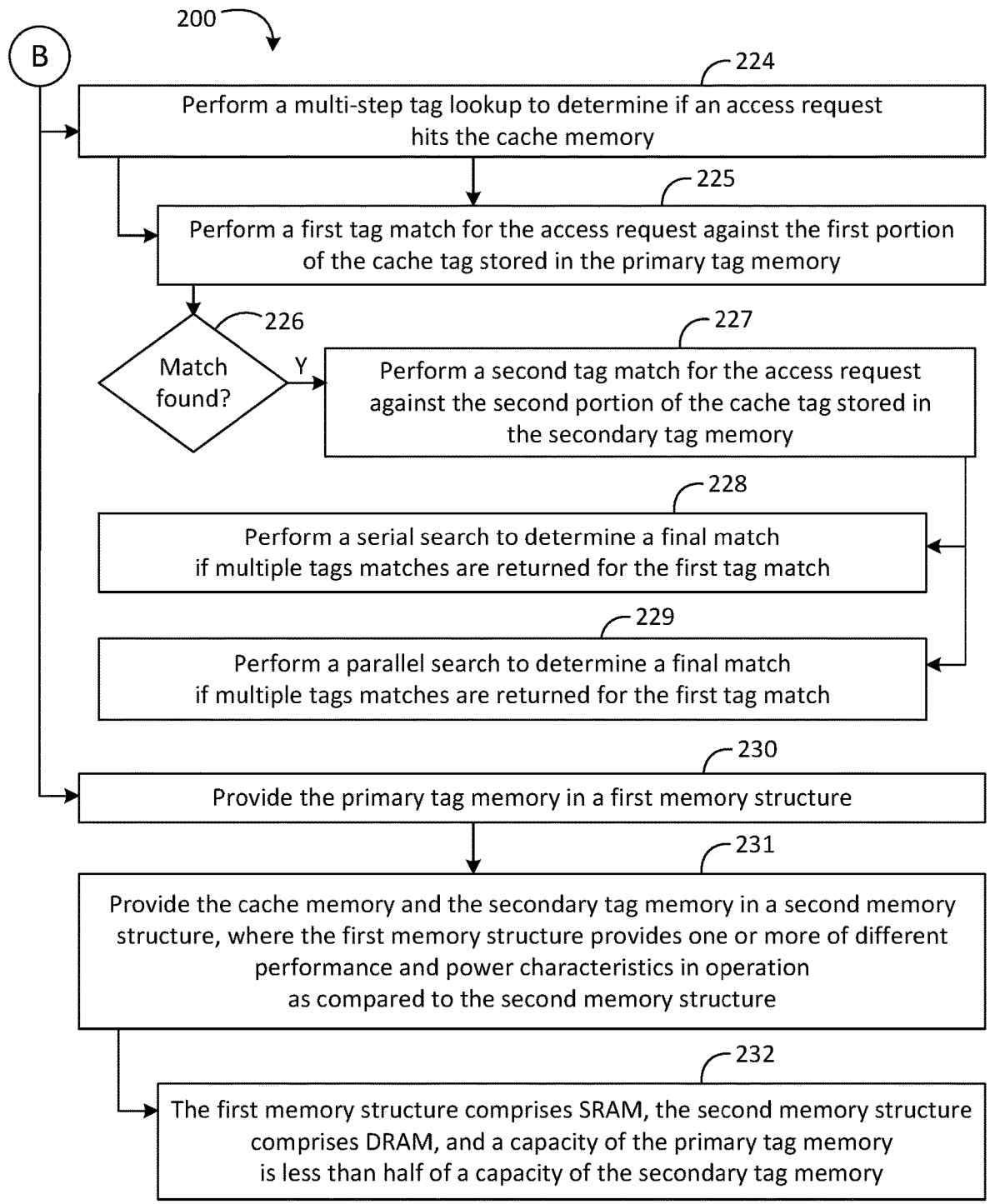

With reference to FIGS. 2A to 2C, an embodiment of a method 200 may include generating a cache tag for data to be stored in a cache memory at box 221, storing a first portion of the cache tag in a primary tag memory at box 222, and storing a second portion of the cache tag in a secondary tag memory, wherein a size of the first portion is smaller than a size of the second portion at box 223. Some embodiments of the method 20 may further include performing a multi-step tag lookup to determine if an access request hits the cache memory at box 224. For example, the method 20 may include performing a first tag match for the access request against the first portion of the cache tag stored in the primary tag memory at box 225, and, if a match is found at box 226, performing a second tag match for the access request against the second portion of the cache tag stored in the secondary tag memory at box 227. The method 20 may also include performing a serial search to determine a final match if multiple tags matches are returned for the first tag match at box 228, or performing a parallel search to determine a final match if multiple tags matches are returned for the first tag match at box 229.

Some embodiments of the method 20 may further include providing the primary tag memory in a first memory structure at box 230, and providing the cache memory and the secondary tag memory in a second memory structure at box 231, where the first memory structure provides one or more of different performance and power characteristics in operation as compared to the second memory structure. For example, the first memory structure comprises SRAM, the second memory structure comprises DRAM, and a capacity of the primary tag memory is less than half of a capacity of the secondary tag memory at box 232.

Figure 3:
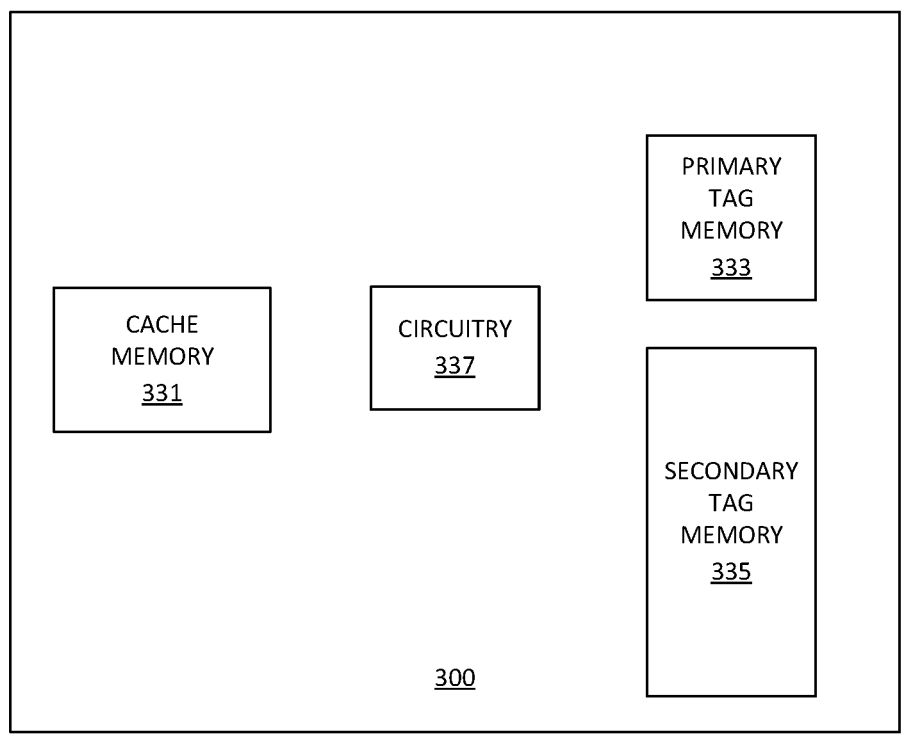
FIG. 3 is a block diagram of an example of an apparatus according to an embodiment.

With reference to FIG. 3, an embodiment of an apparatus 300 may include a cache memory 331, a primary tag memory 333, a secondary tag memory 335, and circuitry 337 coupled to the cache memory 331, the primary tag memory 333, and the secondary tag memory 335. The circuitry 337 may be configured to generate a cache tag for data to be stored in the cache memory 331, store a first portion of the cache tag in the primary tag memory 333, and store a second portion of the cache tag in the secondary tag memory 335. For example, a size of the first portion is smaller than a size of the second portion. In some embodiments, the circuitry 337 may be further configured to perform a multi-step tag lookup to determine if an access request hits the cache memory 331. For example, the circuitry 337 may be configured to perform a first tag match for the access request against the first portion of the cache tag stored in the primary tag memory 333 and, if a match is found, perform a second tag match for the access request against the second portion of the cache tag stored in the secondary tag memory 335. The circuitry 337 may also be configured to perform a serial search to determine a final match if multiple tags matches are returned for the first tag match, or to perform a parallel search to determine a final match if multiple tags matches are returned for the first tag match.

Some embodiments of the apparatus 300 may include a first memory structure to provide the primary tag memory 333, and a second memory structure to provide the cache memory 331 and the secondary tag memory 335, where the first memory structure provides one or more of different performance and power characteristics in operation as compared to the second memory structure. For example, the first memory structure may comprise SRAM, the second memory structure may comprise DRAM, and a capacity of the primary tag memory 333 may be less than half of a capacity of the secondary tag memory 335 (e.g., or much less than the capacity of the secondary tag memory 335).

Figure 4:
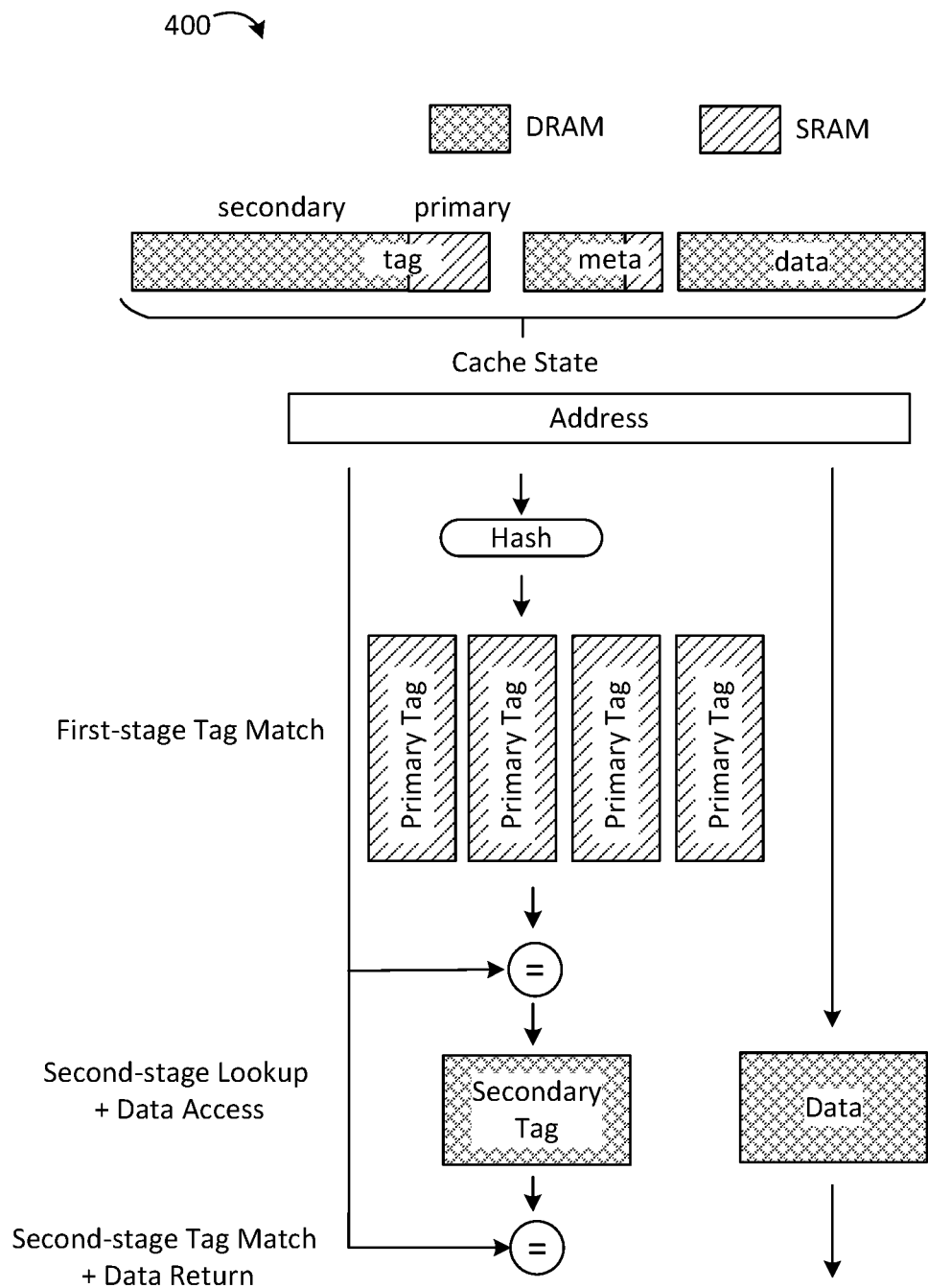
FIG. 4 is a block diagram of an example of a two-stage tag match pipeline according to an embodiment.

With reference to FIG. 4, an embodiment of a two-stage tag match pipeline 400 is configured to perform a two-stage tag lookup. In the example of FIG. 4, items stored in DRAM versus SRAM are distinguished by different cross-hatch patterns as illustrated. Portions of the tag and metadata bits are stored in SRAM and other portions are stored in DRAM. Tag and metadata bits stored in SRAM are referred to as the primary tag, while tag and metadata bits stored in the DRAM are referred to as the secondary tag. The combination of the primary and the secondary tag is equivalent to a tag in a conventional cache and no additional data need be stored. The more bits that are stored in DRAM, the more efficient the cache will be, in terms of area and leakage. Some embodiment may be further fully compatible with other tag compression techniques and optimizations, including sectoring and skewing. For example, embodiments described herein may include composition with sectoring, that may lead to major reductions in tag storage.

In some embodiments, some tag and metadata bits of a DRAM cache are stored in the DRAM itself. Embedded DRAM, for example, may be denser and have lower leakage relative to SRAM. DRAM may have higher per bit access energy, and some embodiments focus on reducing or minimizing the number of accesses to DRAM. Some embodiments may be particularly beneficial for embedded DRAM applications, where there may be more flexibility as to the exact design and shape of the embedded DRAM.

In the first stage, an incoming address is separated into components. A portion of the address is used to index a set in the primary tag store. This store may have several ways, or locations where data may be stored, which can be checked in parallel. Unlike conventional tag stores, the primary tag store contains only a portion of the tag bits of the address. As the primary tag store is smaller than the conventional tag store, the primary tag store requires less energy for a tag comparison, because fewer bits are read from SRAM. Less energy usage may be particularly beneficial in caches with low hit rates.

To improve performance, the address may be hashed when performing tag lookups. Hash-induced randomization reduces the number of times partial match conflicts occur during the first stage of the cache lookup, which improves the performance of the cache. Hashing costs little extra logic, particularly relative to the large size of the cache tags. Hash functions may be applied to the primary tag bits, the secondary tag bits or any combination thereof. Hashing may be invertible in some embodiments, that is a one-to-one mapping of inputs of the hash function to outputs of the hash function.

If a tag comparison with the primary tag store indicates one or more matches, the target address may be in the cache. In this case, data access and secondary tag access are launched. After some cycles, the data and secondary tag are returned. At this point, the second half of the tag match occurs. If the secondary tag matches, the match indicates that the data fetched is the target data and this data may be returned to lower levels of the cache hierarchy. This path has the same latency as a conventional DRAM cache. If no match is found, it means that the target data is not in the cache, and that the next level of the memory hierarchy must be queried. This path has the same latency as a conventional cache. In both cases policy metadata is updated, as in a normal cache.

Because the primary tag is only a subset of the full tag, it is possible that false matches can occur. There are two cases. The first case is that a primary tag match is indicated, and the secondary tag match fails. This means that the data was not in the cache. In this case, a latency penalty is incurred, which is the equivalent of the DRAM access (e.g., an overall latency penalty of 10-20%). A second possibility is that multiple matches occur. In this case, it is likely that one of the matches is the target data.

Figure 5:
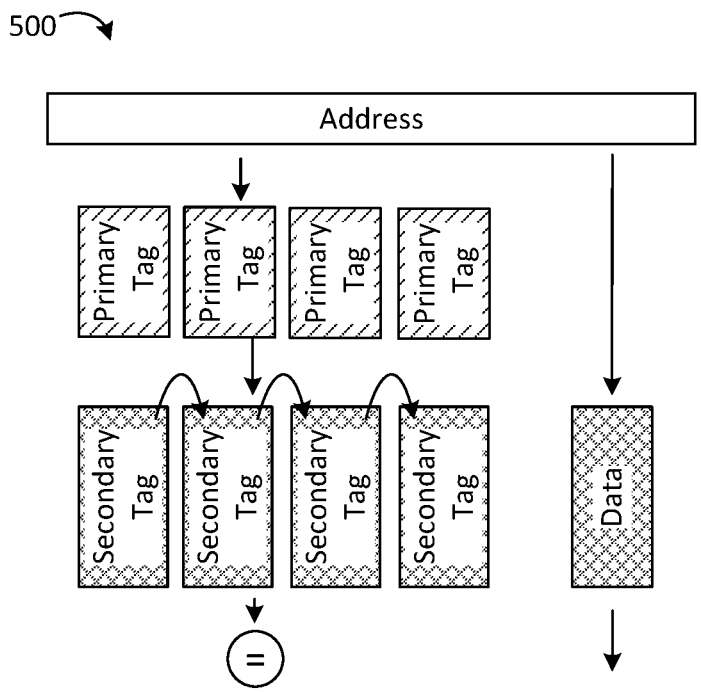
FIG. 5 is a block diagram of an example of a second stage serial lookup according to an embodiment.
Figure 6:
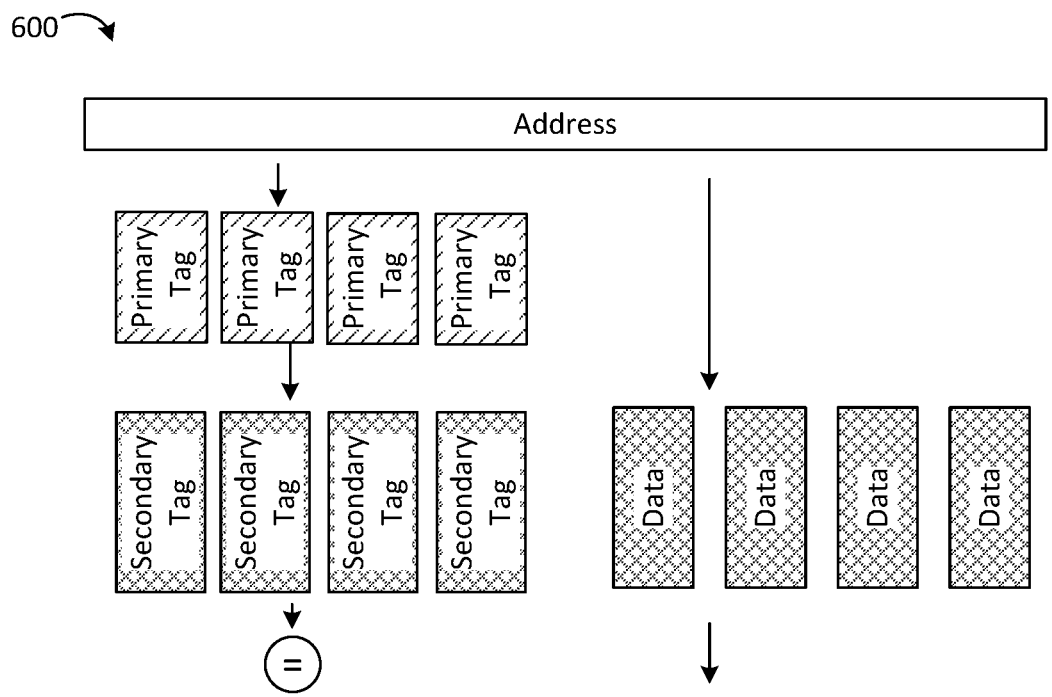
FIG. 6 is a block diagram of an example of a second stage parallel lookup according to an embodiment.

With reference to FIGS. 5 and 6, embodiments of different second stage lookups include a serial lookup 500 (FIG. 5) and a parallel lookup 600 (FIG. 6). In the case of multiple matches, one option is to search for the line serially (FIG. 5). The secondary tag bits can be viewed as a part of the data bits. In some cases, the right value might be found in one search, which means that the collision had no impact on the latency of cache access. A second option is to search in parallel (FIG. 6). The parallel search utilizes more energy, but retains baseline latency. A third possibility is to search the backing store. Searching the backing store may be faster in the case that there are many matches, while utilizing more bandwidth. The probability of more than one false match is exponentially lower than the probability of a single false match. As explained in more detail below, the probability of a false match can be reduced by extending the size of the primary tag, and serial searching may suffice for many implementations.

Figure 7:
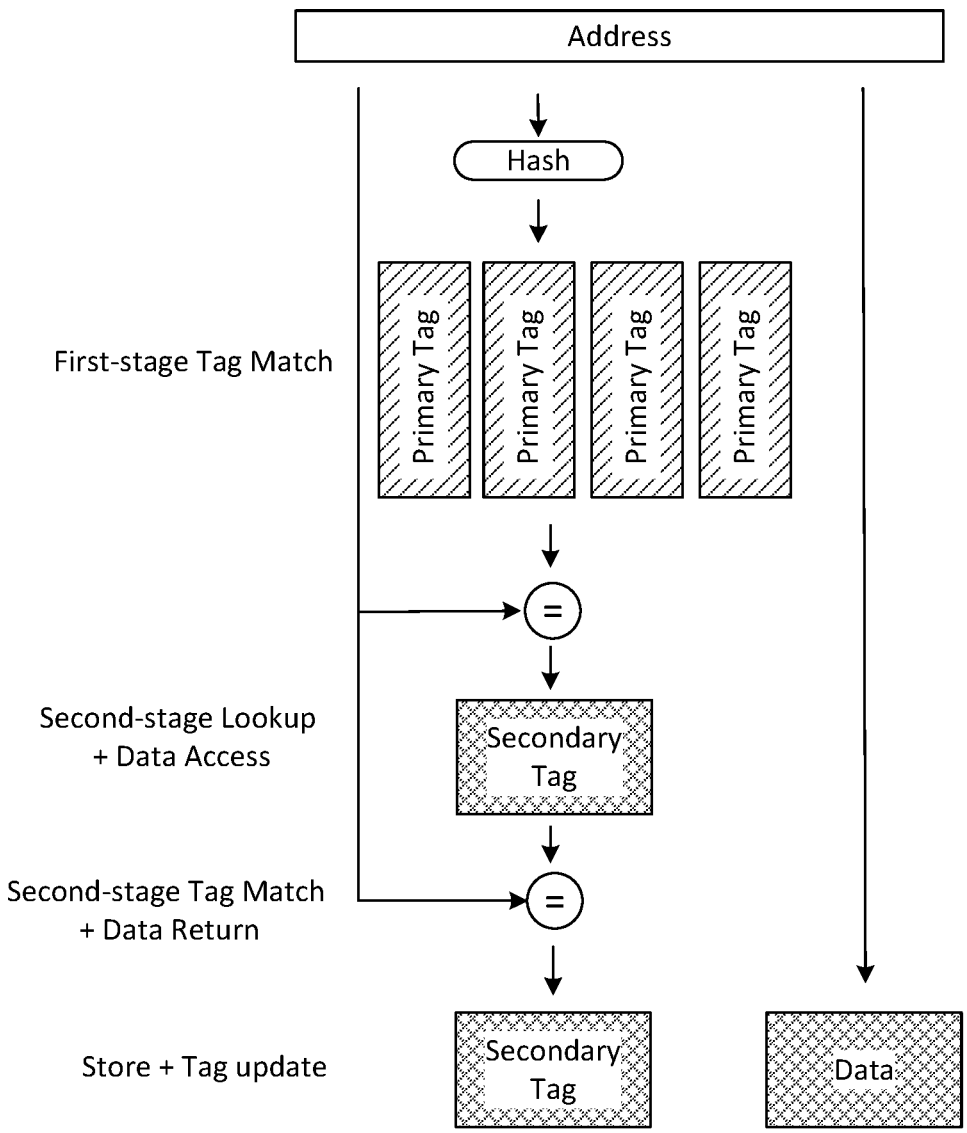
FIG. 7 is a block diagram of an example of a store flow with a hierarchical cache tag according to an embodiment.

FIG. 7 illustrates an embodiment of a store flow 700 for a cache with hierarchical tags. On a store, there are two possibilities: either the data is not in the cache, or the data is in the cache. If the data is not in the cache, primary match most likely fails, and the cache flow resembles a baseline cache. If the data is already in the cache, the store flow has longer latency. In particular, a secondary tag match must first occur to verify that the data is actually in the cache. Only then can the data be overwritten as a subsequent step. Although the latency is longer, it is not likely to expose performance loss as writes are typically not on a critical path. No extra accesses to the data store are required in this flow. Victimization can occur in parallel with tag lookup, in which victim data is pulled from the cache in parallel with the tag check, as line cache re-writes are uncommon.

In other respects, the behavior of the DRAM cache is similar to the behavior of a conventional DRAM cache. To improve performance, the address may be hashed when performing tag look ups. Hashing reduces the number of times partial match conflicts occur during the first stage of the cache lookup, which improves the performance of the cache. A similar strategy may be applied to sector bits, that is randomizing which sector belongs to which tag bit.

Figure 8:
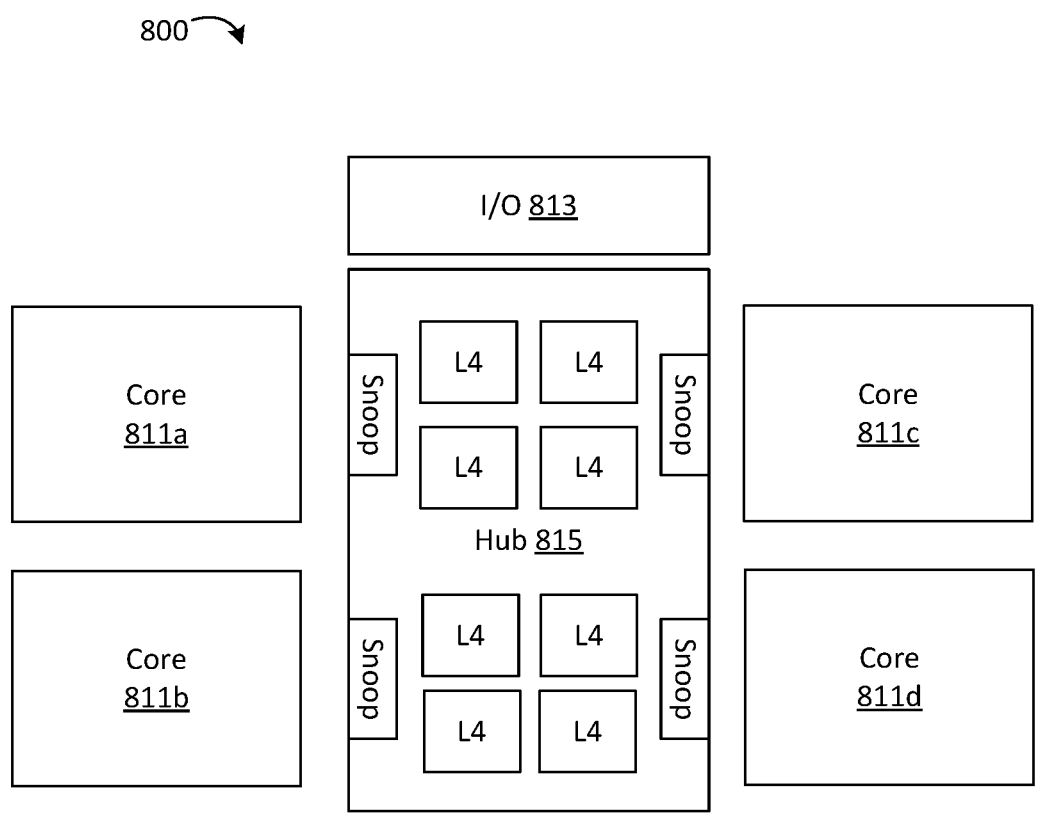
FIG. 8 is a block diagram of an example of a system according to an embodiment.

With reference to FIG. 8, an embodiment of a system 800 includes various caches that may utilize multi-stage cache tags. In some embodiments, a last-level cache (LLC) may utilize multi-stage cache tags. In some embodiments, a level four (L4) cache may utilize multi-stage cache tags. For example, the system 800 includes multiple processor cores 811a to 811d and an I/O interface 813 (e.g., a compute express link (CXL) interface coupled to a hub 815 (e.g., a platform controller hub (PCH). The hub 815 includes L4 cache and snoop filters (e.g., ULTRA PATH INTERCONNECT (UPI) snoop filters). One or more of the I/O interface 813, the snoop filters, and the L4 cache may be configured to utilize embodiments of the multi-stage cache described herein. For example, a portion of the L4 cache may be SRAM for a primary tag memory and a portion of the L4 cache may be DRAM for a secondary tag memory.

Although some embodiments of a two-stage tag mechanism utilize underlying memory technology with different characteristics, some embodiments may be applied to any less latency-sensitive cache, even where the primary tag memory and the secondary tag memory utilize the same underlying memory technology. Some embodiments likely require at least one cycle of additional latency for the primary tag check. For core-distant tag-based stores, like UPI snoop filters, CXL page trackers, etc., these extra cycles likely do not materially impact performance and some embodiments may provide energy reduction for such tag-based stores. Because these caches may not be implemented in DRAM, it is the case that some savings, such as leakage and area reduction will not carry over from the DRAM-based implementation. In some embodiments, such as SRAM-only caches, the number of match stages may be increased beyond two, at the cost of additional latency. More than two tag match stages may further reduce or minimize dynamic power.

Without being limited to theory of operation, as the associativity of a cache increases, the probability of a false match increases (e.g., because there are more primary tags that could conflict). As the number of primary bits increases, the probability of a false match decreases as the tag space is larger. It appears that the probability of false match is not influenced by the capacity of the cache. For lower associativity, in some embodiments, very few primary bits are needed. For example, a 4-way cache may utilize only 10 bits of primary tag to achieve a false match probability of <1%. In another example, a 16-way cache may utilize 14 bits to achieve similar results. In practice, the number of bits required may be somewhat less than theorized, considering the actual behavior of sectoring bits. For example, an example tag for a 16-way cache may have 21 bits in DRAM and 16 bits in SRAM, where 11 of the bits in SRAM correspond to the primary tag (e.g., and the other bits in SRAM are for sectoring, etc.), and may provide a false match rate of less than 1% for most workloads. As compared to the storing the full tag in SRAM, the reduced size of the primary tag provides an about 60% reduction. The reduction in SRAM footprint also results in a significant savings leakage power.

Although much of the foregoing is in connection with DRAM caches, embodiments described here may generalize to a wide variety of other caches and may also be applied to other levels of a cache hierarchy and other types of caches including hardware or software caches. Embodiments may be particularly advantageous for caches implemented with different memory technologies with different characteristics that are combined (e.g., especially density).

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
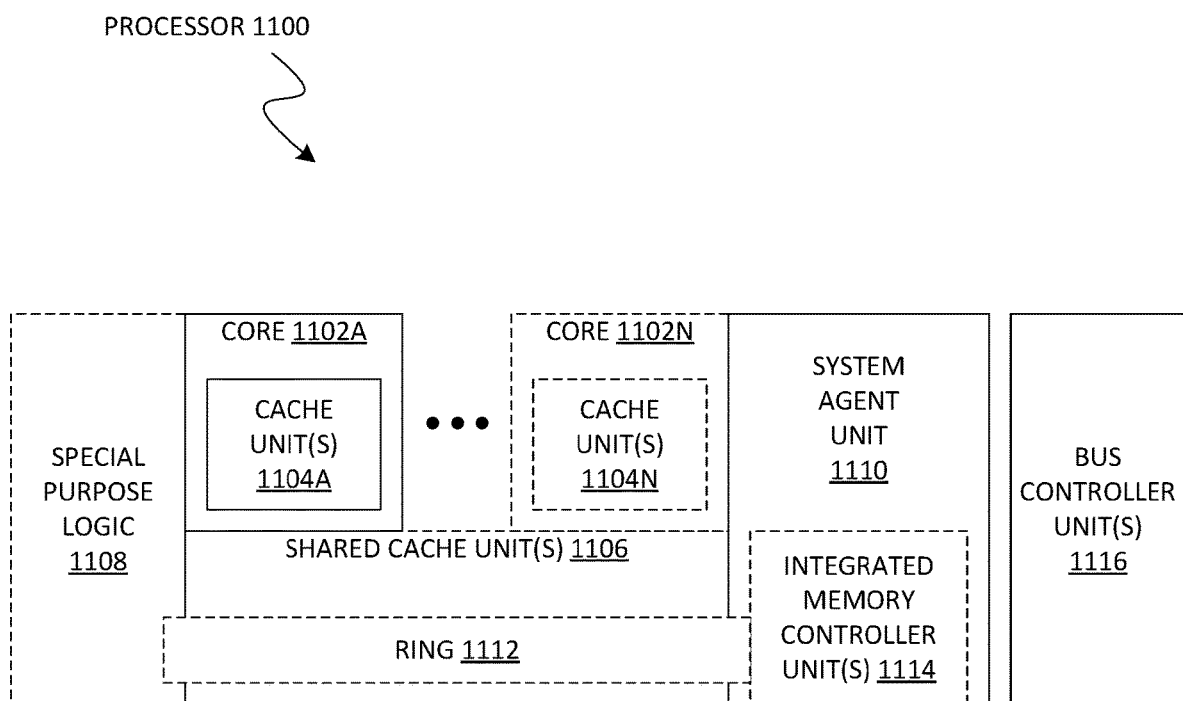
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
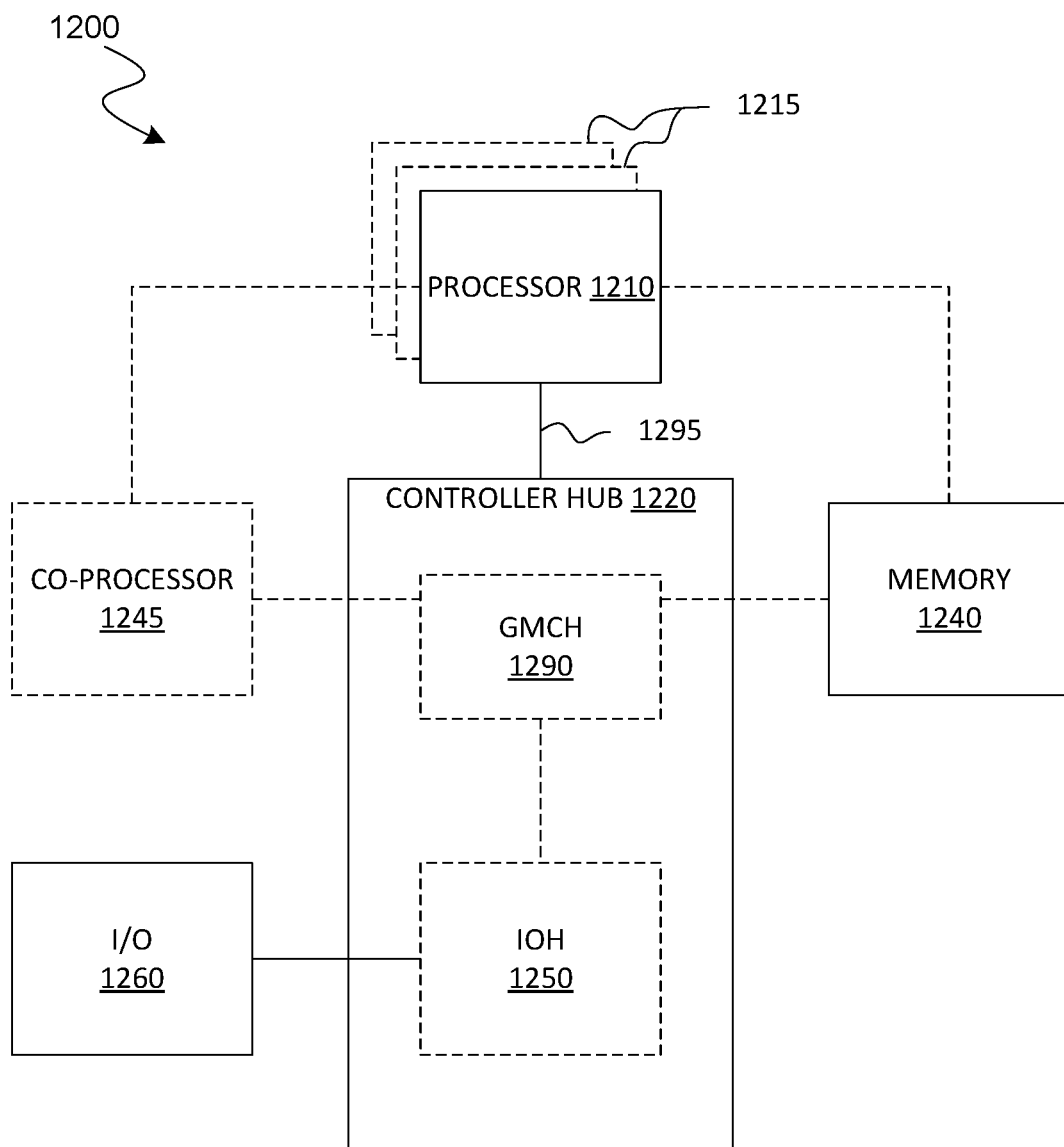
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s)

1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
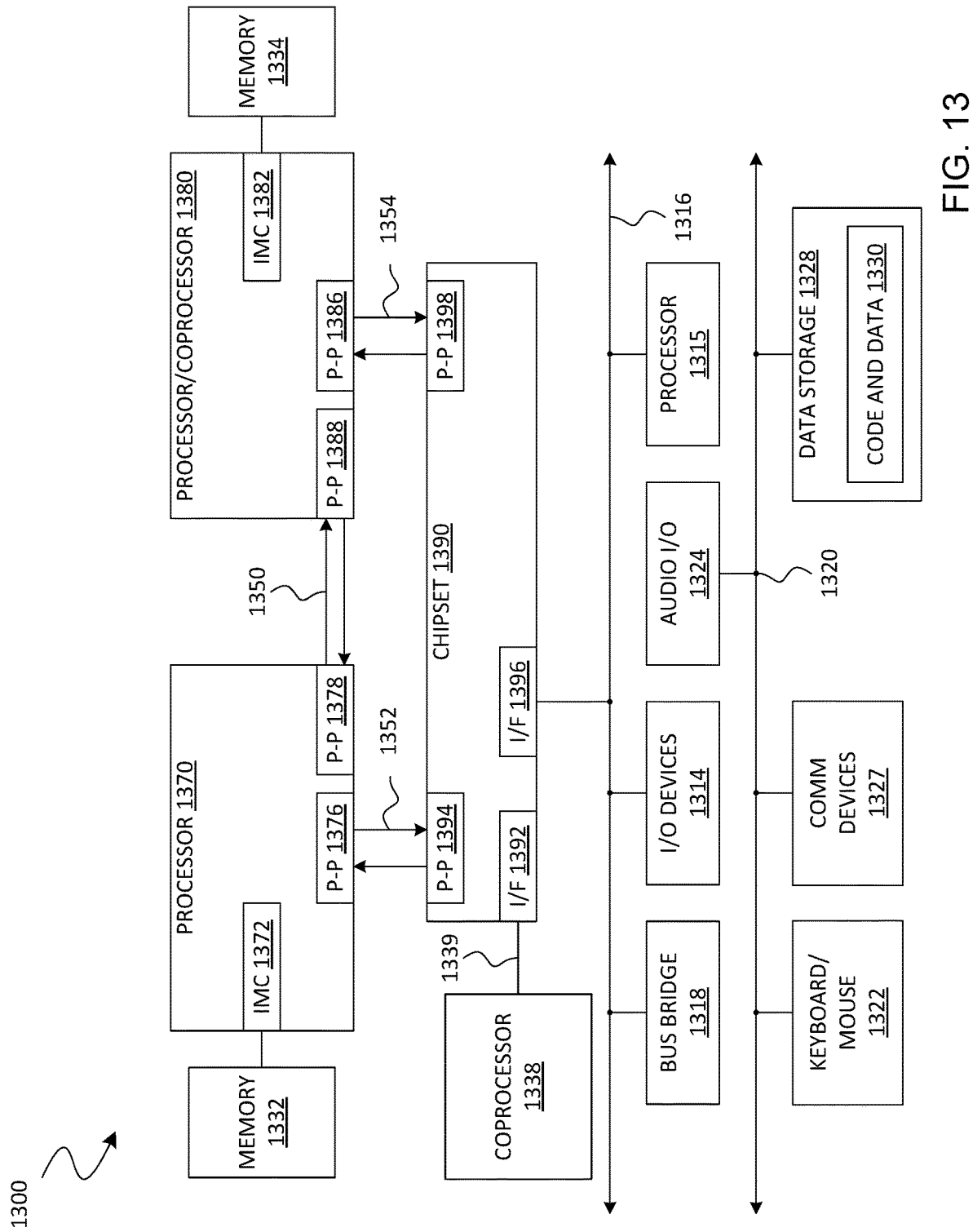

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
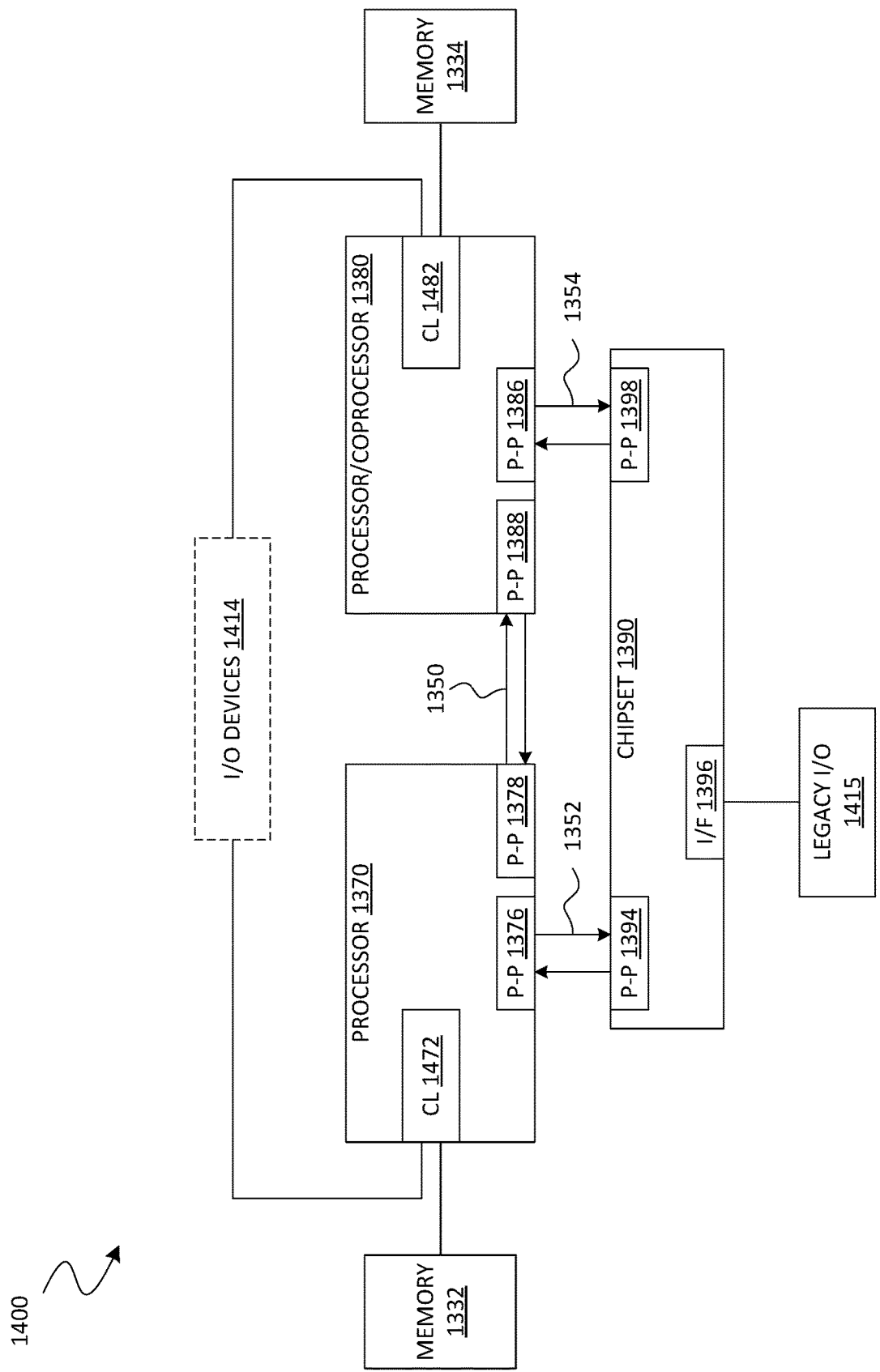

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
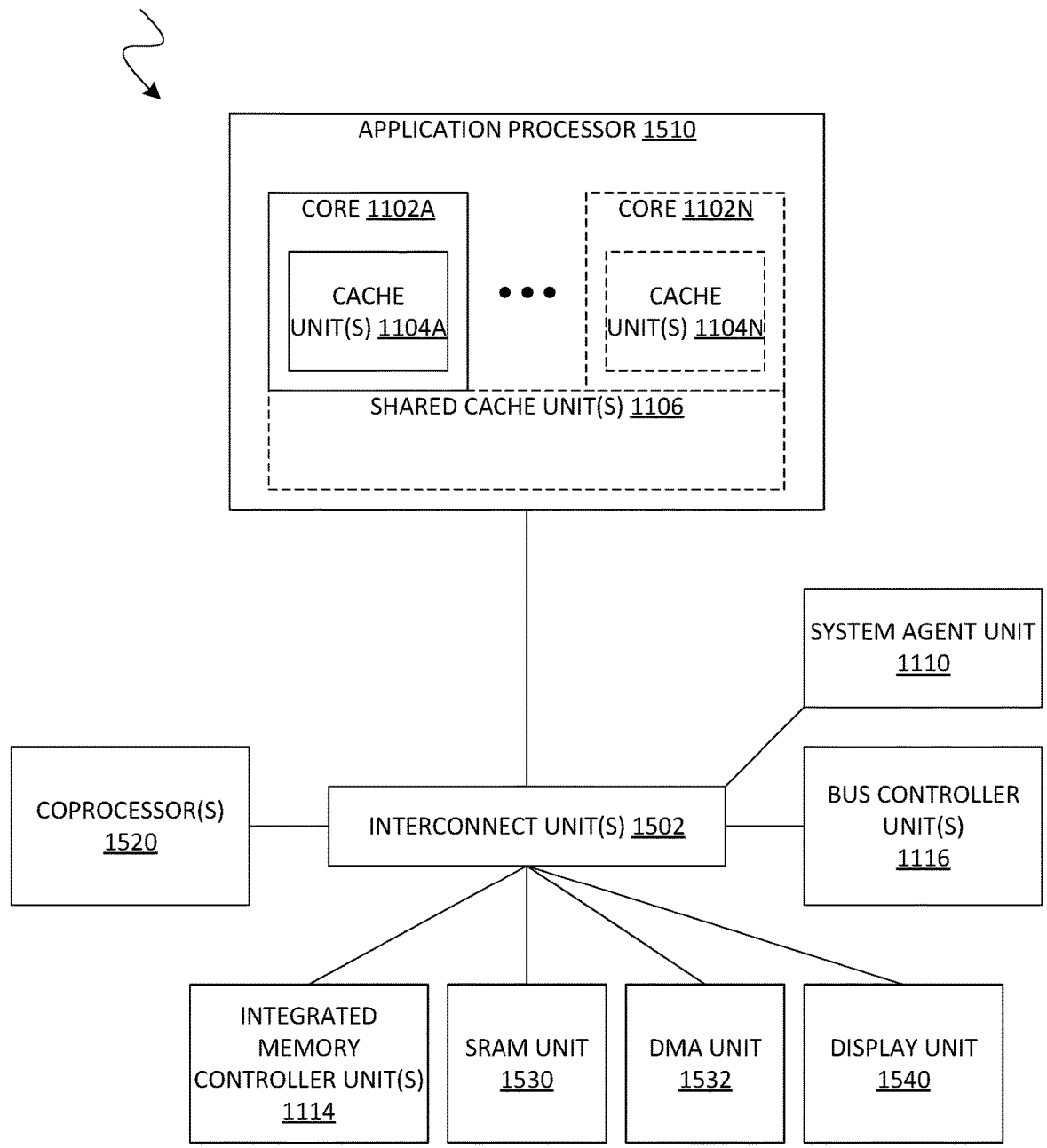

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
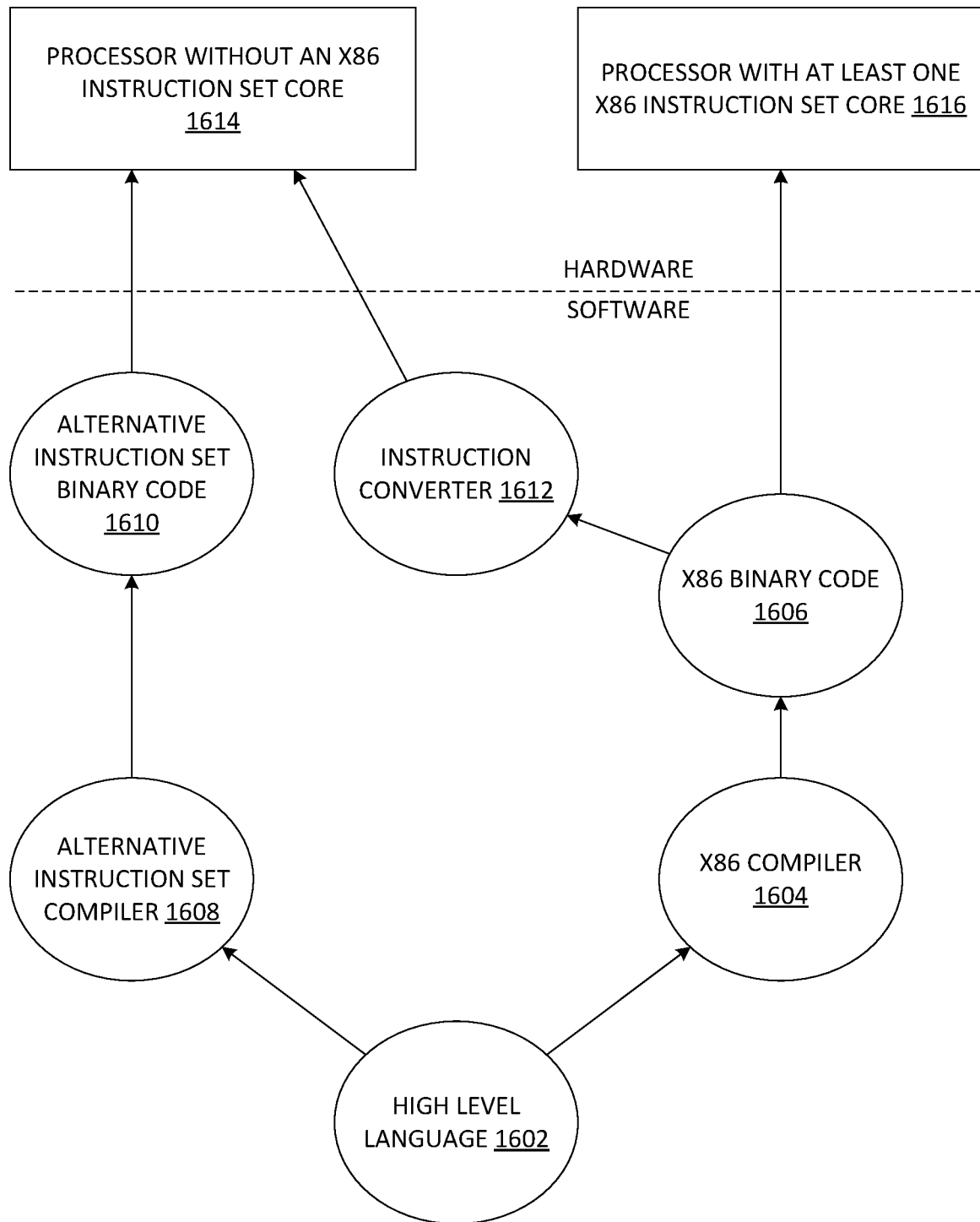
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

ADDITIONAL NOTES AND EXAMPLES

Example 1 includes an apparatus, comprising a cache memory, a primary tag memory, a secondary tag memory, and circuitry coupled to the cache memory, the primary tag memory, and the secondary tag memory to generate a cache tag for data to be stored in the cache memory, store a first portion of the cache tag in the primary tag memory, and store a second portion of the cache tag in the secondary tag memory, wherein a size of the first portion is smaller than a size of the second portion.

Example 2 includes the apparatus of Example 1, wherein the circuitry is further to perform a multi-step tag lookup to determine if an access request hits the cache memory.

Example 3 includes the apparatus of Example 2, wherein the circuitry is further to perform a first tag match for the access request against the first portion of the cache tag stored in the primary tag memory, and, if a match is found, perform a second tag match for the access request against the second portion of the cache tag stored in the secondary tag memory.

Example 4 includes the apparatus of Example 3, wherein the circuitry is further to perform a serial search to determine a final match if multiple tags matches are returned for the first tag match.

Example 5 includes the apparatus of Example 3, wherein the circuitry is further to perform a parallel search to determine a final match if multiple tags matches are returned for the first tag match.

Example 6 includes the apparatus of any of Examples 1 to 5, further comprising a first memory structure to provide the primary tag memory, and a second memory structure to provide the cache memory and the secondary tag memory, wherein the first memory structure provides one or more of different performance and power characteristics in operation as compared to the second memory structure.

Example 7 includes the apparatus of Example 6, wherein the first memory structure comprises static random access memory (SRAM), wherein the second memory structure comprises dynamic random access memory (DRAM), and wherein a capacity of the primary tag memory is less than half of a capacity of the secondary tag memory.

Example 8 includes an integrated circuit comprising circuitry to generate a cache tag for data to be stored in a cache memory, store a first portion of the cache tag in a primary tag memory, and store a second portion of the cache tag in a secondary tag memory, wherein a size of the first portion is smaller than a size of the second portion.

Example 9 includes the integrated circuit of Example 8, wherein the circuitry is further to perform a multi-step tag lookup to determine if an access request hits the cache memory.

Example 10 includes the integrated circuit of Example 9, wherein the circuitry is further to perform a first tag match for the access request against the first portion of the cache tag stored in the primary tag memory, and, if a match is found, perform a second tag match for the access request against the second portion of the cache tag stored in the secondary tag memory.

Example 11 includes the integrated circuit of Example 10, wherein the circuitry is further to perform a serial search to determine a final match if multiple tags matches are returned for the first tag match.

Example 12 includes the integrated circuit of Example 10, wherein the circuitry is further to perform a parallel search to determine a final match if multiple tags matches are returned for the first tag match.

Example 13 includes the integrated circuit of any of Examples 8 to 12, further comprising a first memory structure to provide the primary tag memory, and a second memory structure to provide the cache memory and the secondary tag memory, wherein the first memory structure provides one or more of different performance and power characteristics in operation as compared to the second memory structure.

Example 14 includes the integrated circuit of Example 13, wherein the first memory structure comprises static random access memory (SRAM), wherein the second memory structure comprises dynamic random access memory (DRAM), and wherein a capacity of the primary tag memory is less than half of a capacity of the secondary tag memory.

Example 15 includes a method, comprising generating a cache tag for data to be stored in a cache memory, storing a first portion of the cache tag in a primary tag memory, and storing a second portion of the cache tag in a secondary tag memory, wherein a size of the first portion is smaller than a size of the second portion.

Example 16 includes the method of Example 15, further comprising performing a multi-step tag lookup to determine if an access request hits the cache memory.

Example 17 includes the method of Example 16, further comprising performing a first tag match for the access request against the first portion of the cache tag stored in the primary tag memory, and, if a match is found, performing a second tag match for the access request against the second portion of the cache tag stored in the secondary tag memory.

Example 18 includes the method of Example 17, further comprising performing a serial search to determine a final match if multiple tags matches are returned for the first tag match.

Example 19 includes the method of Example 17, further comprising performing a parallel search to determine a final match if multiple tags matches are returned for the first tag match.

Example 20 includes the method of any of Examples 15 to 19, further comprising providing the primary tag memory in a first memory structure, and providing the cache memory and the secondary tag memory in a second memory structure, wherein the first memory structure provides one or more of different performance and power characteristics in operation as compared to the second memory structure.

Example 21 includes the method of Example 20, wherein the first memory structure comprises static random access memory (SRAM), wherein the second memory structure comprises dynamic random access memory (DRAM), and wherein a capacity of the primary tag memory is less than half of a capacity of the secondary tag memory.

Example 22 includes an apparatus, comprising means for generating a cache tag for data to be stored in a cache memory, means for storing a first portion of the cache tag in a primary tag memory, and means for storing a second portion of the cache tag in a secondary tag memory, wherein a size of the first portion is smaller than a size of the second portion.

Example 23 includes the apparatus of Example 22, further comprising means for performing a multi-step tag lookup to determine if an access request hits the cache memory.

Example 24 includes the apparatus of Example 23, further comprising means for performing a first tag match for the access request against the first portion of the cache tag stored in the primary tag memory, and, if a match is found, means for performing a second tag match for the access request against the second portion of the cache tag stored in the secondary tag memory.

Example 25 includes the apparatus of Example 24, further comprising means for performing a serial search to determine a final match if multiple tags matches are returned for the first tag match.

Example 26 includes the apparatus of Example 24, further comprising means for performing a parallel search to determine a final match if multiple tags matches are returned for the first tag match.

Example 27 includes the apparatus of any of Examples 22 to 26, further comprising means for providing the primary tag memory in a first memory structure, and means for providing the cache memory and the secondary tag memory in a second memory structure, wherein the first memory structure provides one or more of different performance and power characteristics in operation as compared to the second memory structure.

Example 28 includes the apparatus of Example 27, wherein the first memory structure comprises static random access memory (SRAM), wherein the second memory structure comprises dynamic random access memory (DRAM), and wherein a capacity of the primary tag memory is less than half of a capacity of the secondary tag memory.

Example 29 includes at least one non-transitory machine readable medium comprising a plurality of instructions that, in response to being executed on a computing device, cause the computing device to generate a cache tag for data to be stored in a cache memory, store a first portion of the cache tag in a primary tag memory, and store a second portion of the cache tag in a secondary tag memory, wherein a size of the first portion is smaller than a size of the second portion.

Example 30 includes the at least one non-transitory machine readable medium of Example 29, comprising a plurality of further instructions that, in response to being executed on the computing device, cause the computing device to perform a multi-step tag lookup to determine if an access request hits the cache memory.

Example 31 includes the at least one non-transitory machine readable medium of Example 30, comprising a plurality of further instructions that, in response to being executed on the computing device, cause the computing device to perform a first tag match for the access request against the first portion of the cache tag stored in the primary tag memory, and, if a match is found, perform a second tag match for the access request against the second portion of the cache tag stored in the secondary tag memory.

Example 32 includes the at least one non-transitory machine readable medium of Example 31, comprising a plurality of further instructions that, in response to being executed on the computing device, cause the computing device to perform a serial search to determine a final match if multiple tags matches are returned for the first tag match.

Example 33 includes the at least one non-transitory machine readable medium of Example 31, comprising a plurality of further instructions that, in response to being executed on the computing device, cause the computing device to perform a parallel search to determine a final match if multiple tags matches are returned for the first tag match.

Example 34 includes the at least one non-transitory machine readable medium of any of Examples 29 to 33, comprising a plurality of further instructions that, in response to being executed on the computing device, cause the computing device to access the primary tag memory in a first memory structure, and access the cache memory and the secondary tag memory in a second memory structure, wherein the first memory structure provides one or more of different performance and power characteristics in operation as compared to the second memory structure.

Example 35 includes the at least one non-transitory machine readable medium of Example 34, wherein the first memory structure comprises static random access memory (SRAM), wherein the second memory structure comprises dynamic random access memory (DRAM), and wherein a capacity of the primary tag memory is less than half of a capacity of the secondary tag memory.

Techniques and architectures for multi-stage cache tags are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
   a cache memory;
   a primary tag memory;
   a secondary tag memory; and
   circuitry coupled to the cache memory, the primary tag memory, and the secondary tag memory to:
      generate a cache tag for data to be stored in the cache memory,
      store in the primary tag memory a primary tag which consists of only a subset of all bits of the cache tag, and
      store in the secondary tag memory a secondary tag, wherein a combination of the primary tag and the secondary tag is equivalent to the cache tag, wherein a first size of the primary tag is smaller than a second size of the secondary tag.

2. The apparatus of claim 1, wherein the circuitry is further to:
   perform a multi-step tag lookup to determine if an access request hits the cache memory.

3. The apparatus of claim 2, wherein the circuitry is further to:
   perform a first tag match for the access request against the primary tag stored in the primary tag memory; and, if a match is found,
   perform a second tag match for the access request against the secondary tag stored in the secondary tag memory.

4. The apparatus of claim 3, wherein the circuitry is further to:
   perform a serial search to determine a final match if multiple tags matches are returned for the first tag match.

5. The apparatus of claim 3, wherein the circuitry is further to:
   perform a parallel search to determine a final match if multiple tags matches are returned for the first tag match.

6. The apparatus of claim 1, further comprising:
   a first memory structure to provide the primary tag memory; and
   a second memory structure to provide the cache memory and the secondary tag memory, wherein the first memory structure provides one or more of different performance and power characteristics in operation as compared to the second memory structure.

7. The apparatus of claim 6, wherein the first memory structure comprises static random access memory (SRAM), wherein the second memory structure comprises dynamic random access memory (DRAM), and wherein a first capacity of the primary tag memory is less than half of a second capacity of the secondary tag memory.

8. An integrated circuit comprising circuitry to:
   generate a cache tag for data to be stored in a cache memory;
   store in a primary tag memory a primary tag which consists of only a subset of all bits of the cache tag; and
   store in a secondary tag memory a secondary tag, wherein a combination of the primary tag and the secondary tag is equivalent to the cache tag, wherein a first size of the primary tag is smaller than a second size of the secondary tag.

9. The integrated circuit of claim 8, wherein the circuitry is further to:
   perform a multi-step tag lookup to determine if an access request hits the cache memory.

10. The integrated circuit of claim 9, wherein the circuitry is further to:
    perform a first tag match for the access request against the primary tag stored in the primary tag memory; and, if a match is found,
    perform a second tag match for the access request against the secondary tag stored in the secondary tag memory.

11. The integrated circuit of claim 10, wherein the circuitry is further to:
    perform a serial search to determine a final match if multiple tags matches are returned for the first tag match.

12. The integrated circuit of claim 10, wherein the circuitry is further to:
    perform a parallel search to determine a final match if multiple tags matches are returned for the first tag match.

13. The integrated circuit of claim 8, further comprising:
    a first memory structure to provide the primary tag memory; and
    a second memory structure to provide the cache memory and the secondary tag memory, wherein the first memory structure provides one or more of different performance and power characteristics in operation as compared to the second memory structure.

14. The integrated circuit of claim 13, wherein the first memory structure comprises static random access memory (SRAM), wherein the second memory structure comprises dynamic random access memory (DRAM), and wherein a first capacity of the primary tag memory is less than half of a second capacity of the secondary tag memory.

15. A method, comprising:
    generating a cache tag for data to be stored in a cache memory;
    storing in a primary tag memory a primary tag which consists of only a subset of all bits of the cache tag; and
    storing in a secondary tag memory a secondary tag, wherein a combination of the primary tag and the secondary tag is equivalent to the cache tag, wherein a first size of the primary tag is smaller than a second size of the secondary tag.

16. The method of claim 15, further comprising:
    performing a multi-step tag lookup to determine if an access request hits the cache memory.

17. The method of claim 16, further comprising:
    performing a first tag match for the access request against the primary tag stored in the primary tag memory; and, if a match is found,
    performing a second tag match for the access request against the secondary tag stored in the secondary tag memory.

18. The method of claim 17, further comprising:
performing a serial search to determine a final match if multiple tags matches are returned for the first tag match.

19. The method of claim 17, further comprising:
performing a parallel search to determine a final match if multiple tags matches are returned for the first tag match.

20. The method of claim 15, further comprising:
providing the primary tag memory in a first memory structure; and
providing the cache memory and the secondary tag memory in a second memory structure, wherein the first memory structure provides one or more of different performance and power characteristics in operation as compared to the second memory structure.

21. The method of claim 20, wherein the first memory structure comprises static random access memory (SRAM), wherein the second memory structure comprises dynamic random access memory (DRAM), and wherein a first capacity of the primary tag memory is less than half of a second capacity of the secondary tag memory.

\* \* \* \* \*